June 16, 1925.

E. C. POOL 1,542,579

WEIGHING SCALE

Filed Dec. 26, 1919     8 Sheets-Sheet 1

Fig.1.

Inventor
Elmer C. Pool.

Witnesses

By George R. Frye.

Attorney

June 16, 1925.

E. C. POOL

WEIGHING SCALE

Filed Dec. 26, 1919     8 Sheets-Sheet 2

Inventor
Elmer C. Pool
By George R. Frye.
Attorney

June 16, 1925.

E. C. POOL 1,542,579

WEIGHING SCALE

Filed Dec. 26, 1919

Inventor
Elmer C. Pool
By George R. Frye.
Attorney

June 16, 1925.

E. C. POOL

WEIGHING SCALE

Filed Dec. 26, 1919

June 16, 1925. 1,542,579
E. C. POOL
WEIGHING SCALE
Filed Dec. 26, 1919 8 Sheets-Sheet 7

Inventor
Elmer C. Pool
By George R. Frye.
Attorney

Patented June 16, 1925.

1,542,579

UNITED STATES PATENT OFFICE.

ELMER C. POOL, OF NEW CASTLE, PENNSYLVANIA, ASSIGNOR TO TOLEDO SCALE COMPANY, OF TOLEDO, OHIO, A CORPORATION OF NEW JERSEY.

WEIGHING SCALE.

Application filed December 26, 1919. Serial No. 347,643.

*To all whom it may concern:*

Be it known that I, ELMER C. POOL, a citizen of the United States, residing at New Castle, in the county of Lawrence and State of Pennsylvania, have invented certain new and useful Improvements in Weighing Scales, of which the following is a specification.

My invention relates to weighing scales designed to weigh comparatively heavy loads, and more particularly to scales employing a beam adapted to serially receive a plurality of pendent weights to offset increasing loads upon the scale platform, though it will be understood that in many or all of its features the invention is applicable to other types of measuring instruments. Preferably the invention is utilized in connection with an automatic or semi-automatic scale, wherein a pendulum or other weight-offsetting device is employed to counterbalance the fractional portion of the load not offset by the pendent weights on the scale beam. A scale of this same type is shown in the companion application for letters patent of Halvor O. Hem, Serial Number 96,511, filed May 10, 1916, wherein is provided an automatic mechanism well adapted for use with my invention and a series of proportional weights arranged one above the other to be successively deposited upon the scale beam as required.

This invention is designed primarily to improve the weight-depositing mechanism of scales of this type, and to provide a simple and highly efficient weight-depositing mechanism that is so compact as to occupy only a small part of the space ordinarily consumed by such mechanisms, while allowing for abundant clearance of each weight at all times. The pendent weight units are placed side by side and are always positioned and supported against undue movement whether resting upon their supporting frame or upon the scale beam, a novel rotative element being utilized to lift the weights serially from the supporting frame and guide them into position upon the weight-receiving portion of the scale beam. Rotation of this weight-depositing element in the opposite direction re-aligns the weights in their original positions on the supporting frame, and both the placing and removal of the weights is independent of the position of the scale beam in its weight-offsetting functions.

Other objects and advantages of the invention will appear from the following description wherein reference is had to the accompanying drawings illustrating preferred embodiments of my invention and wherein similar reference numerals designate similar parts throughout the several views.

Figures 10, 11:
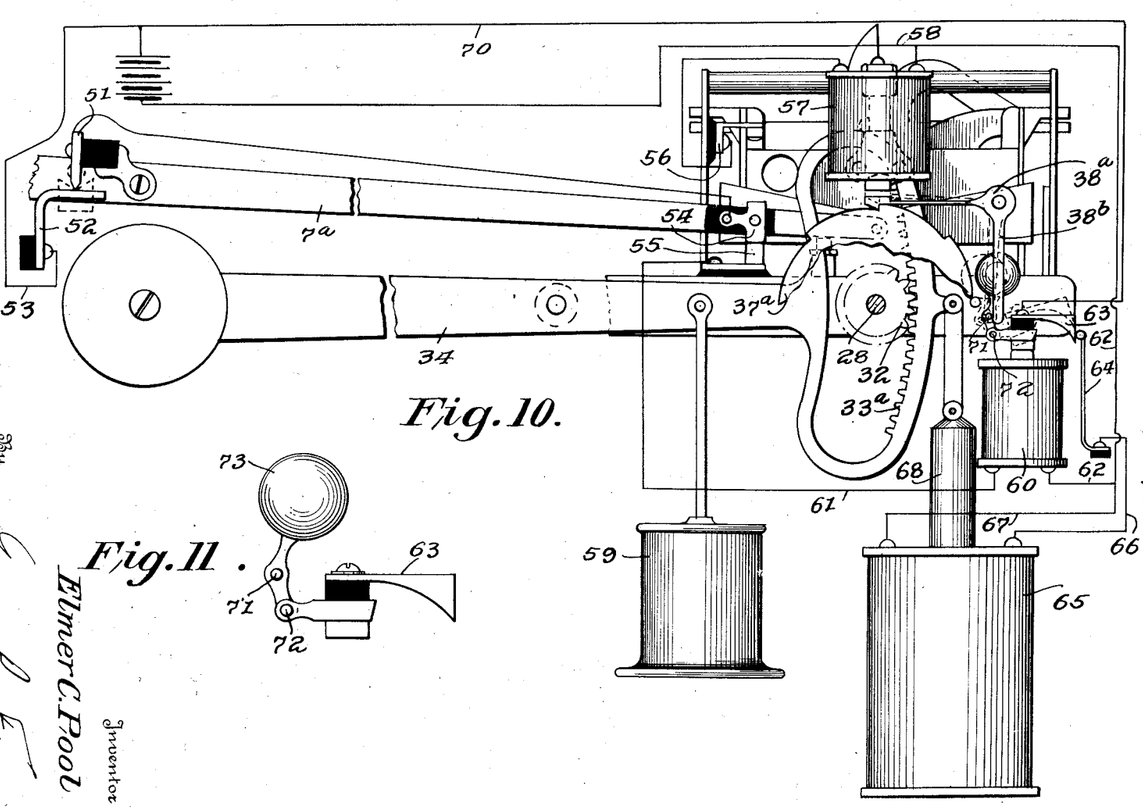
Figure 10 is a detail side elevation of a slightly modified form utilizing an electrical actuating and controlling mechanism for depositing and removing the weight units.
Figure 11 is a detail section of a switch utilized in the construction shown in Figure 10.

I will first describe the form of the invention shown in Figures 1 to 9, it being understood that the form shown in Figure 10 is identical therewith except with respect to details to be hereinafter pointed out. As usual in scales of this character, the casing 5 of the scale is secured upon a base 6 adapted to rest upon a platform-supporting frame enclosing the levers upon which the scale platform rests, suitable connection being made from the platform levers to the scale beam 7 and the automatic weight-offsetting mechanism 8 (see Figure 1). The scale beam 7 is fulcrumed, as at 9, within the casing 5 and is suitably connected, as by the steelyard rod 10, with the platform-supporting lever mechanism and by the hook rod 11 with the pendulum counterbalance mechanism 8. It is to be understood that any suitable pendulum counterbalance mechanism may be employed in my scale, or any other type of automatic weight-offsetting mechanism may be associated with my invention, such automatic mechanism forming no part of the present invention. The pendulum counterbalance herein illustrated (Figure 1) is one that has been found to successfully demonstrate the capabilities of my invention, and shows a double pendulum type adapted to be suitably actuated through the medium of the hook rod 11, scale beam 7, steelyard rod 10 and the platform-supporting scale levers whenever a load is placed upon the scale platform, the pendulums being swung upwardly into positions counterbalancing the weight upon the platform. The upward movement of the pendulums effects a rotation of the indicating hand 3 over the graduated dial 4 bearing the weight numerals. Should the weight upon the platform exceed the counterbalancing capacities of the pendulum mechanism, one or more pendent weights are deposited upon the scale beam to aid in offsetting the load and the pendulum counterbalance is utilized to counterbalance merely the fractional part remaining over the weight offset by the pendent weight or weights. Inasmuch as the present invention is not dependent for its operation upon any particular form of pendulum mechanism, no attempt is made in this application to show the several connections, nor to delineate the action of this portion of the scale in its load-counterbalancing operations, only so much of the counterbalancing mechanism being shown as is necessary to clearly portray the operation and co-action of the remaining scale mechanism herein disclosed.

Figure 1:
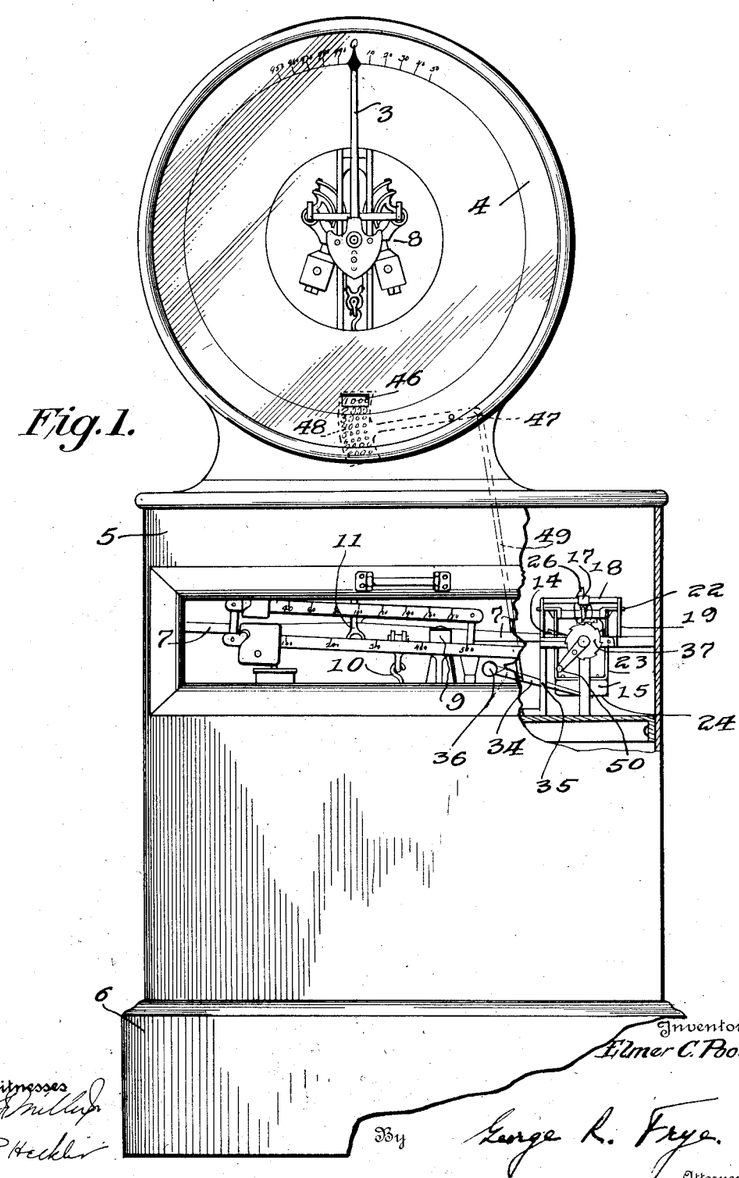
Figure 1 is a front elevation of a weighing scale embodying my invention, parts being broken away to show the interior mechanism.
Figure 2:
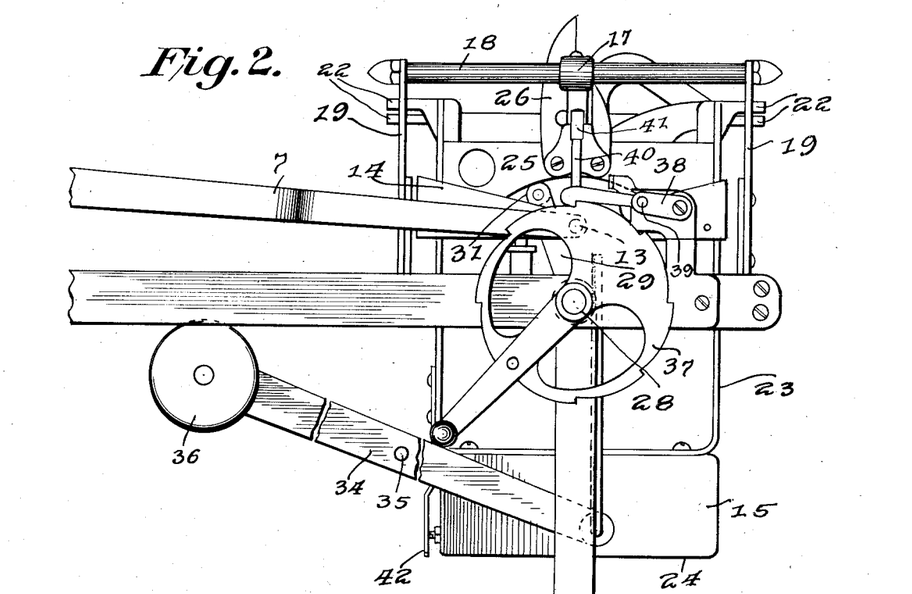
Figure 2 is a front elevation of the weight-depositing and removing mechanism.
Figure 3:
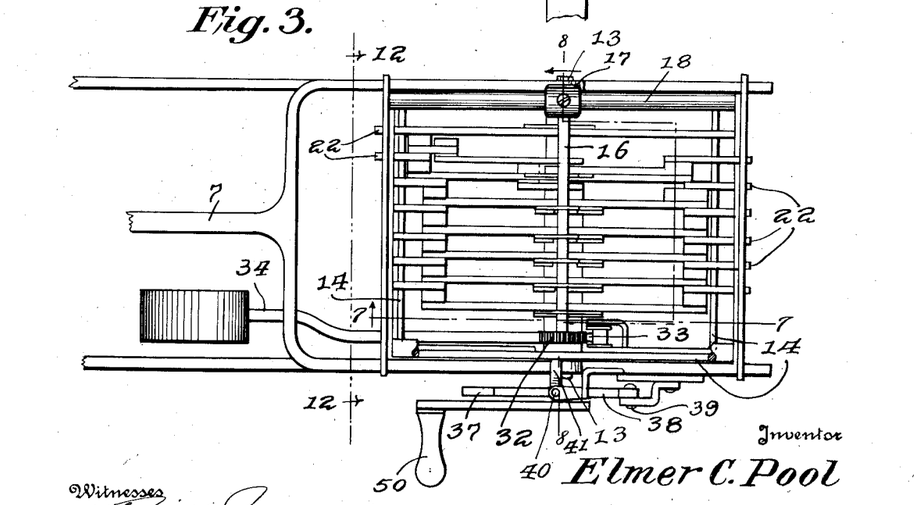
Figure 3 is a plan view thereof, with the weights removed from the scale beam and with portions broken away to show the rack and pinion mechanism.
Figure 4:
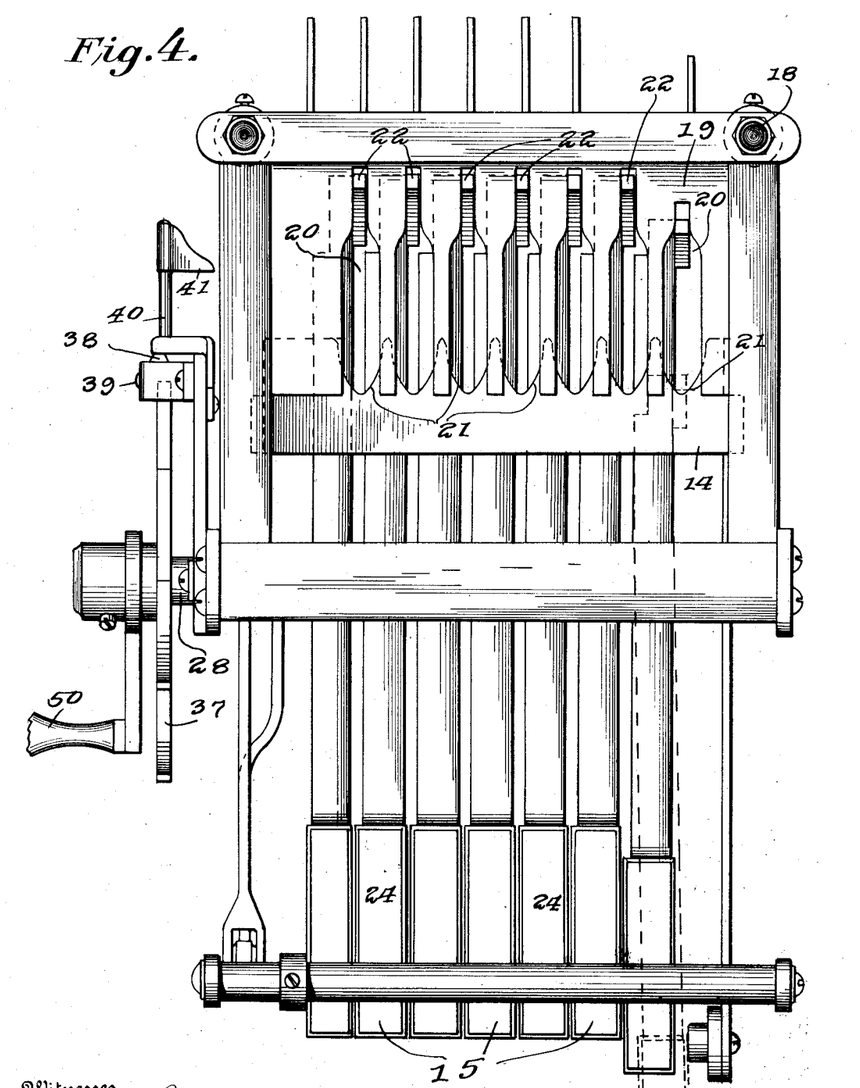
Figure 4 is an enlarged end view of the weight-depositing mechanism with the weights removed from the scale beam.
Figure 8:
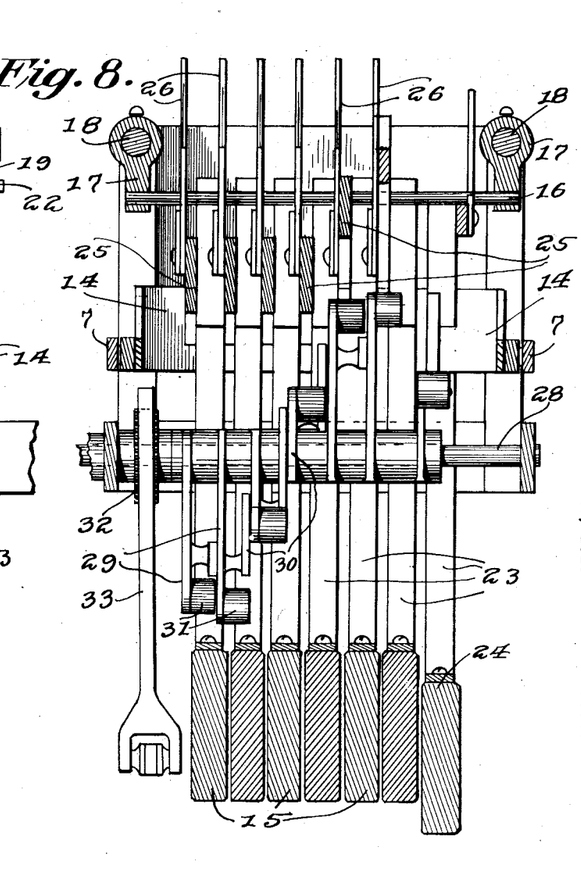
Figure 8 is a vertical transverse sectional view on the line 8—8 of Figure 3.
Figure 9:
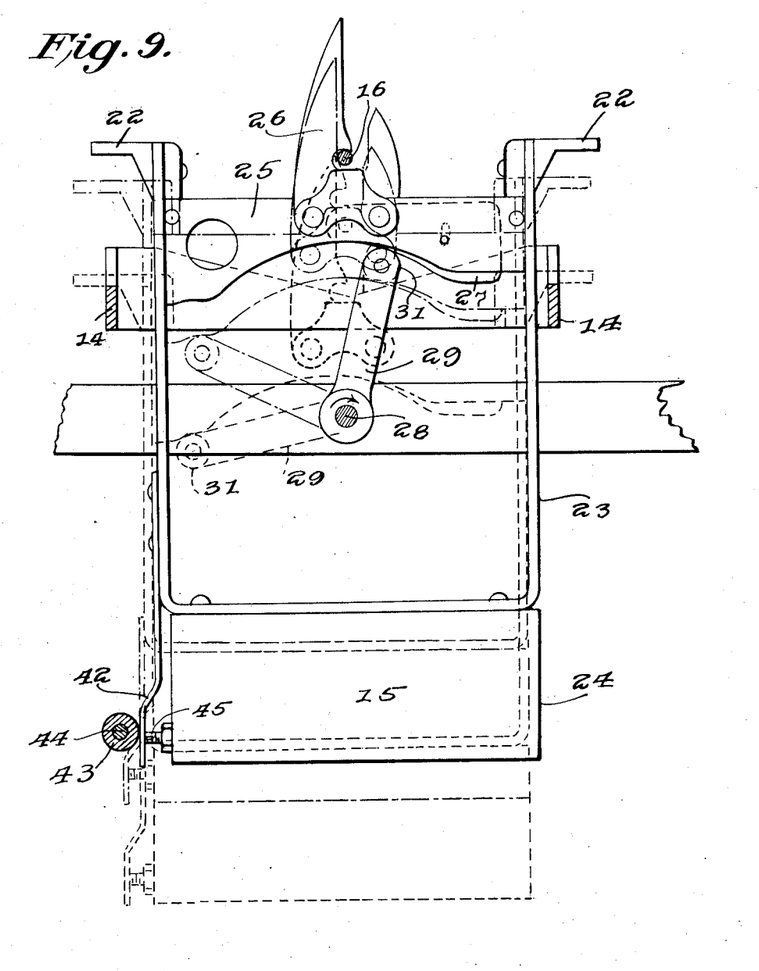
Figure 9 is a view similar to Figure 7, showing in diagram the positions of the weights when lifted from the supporting frame to the scale beam.
Figure 12:
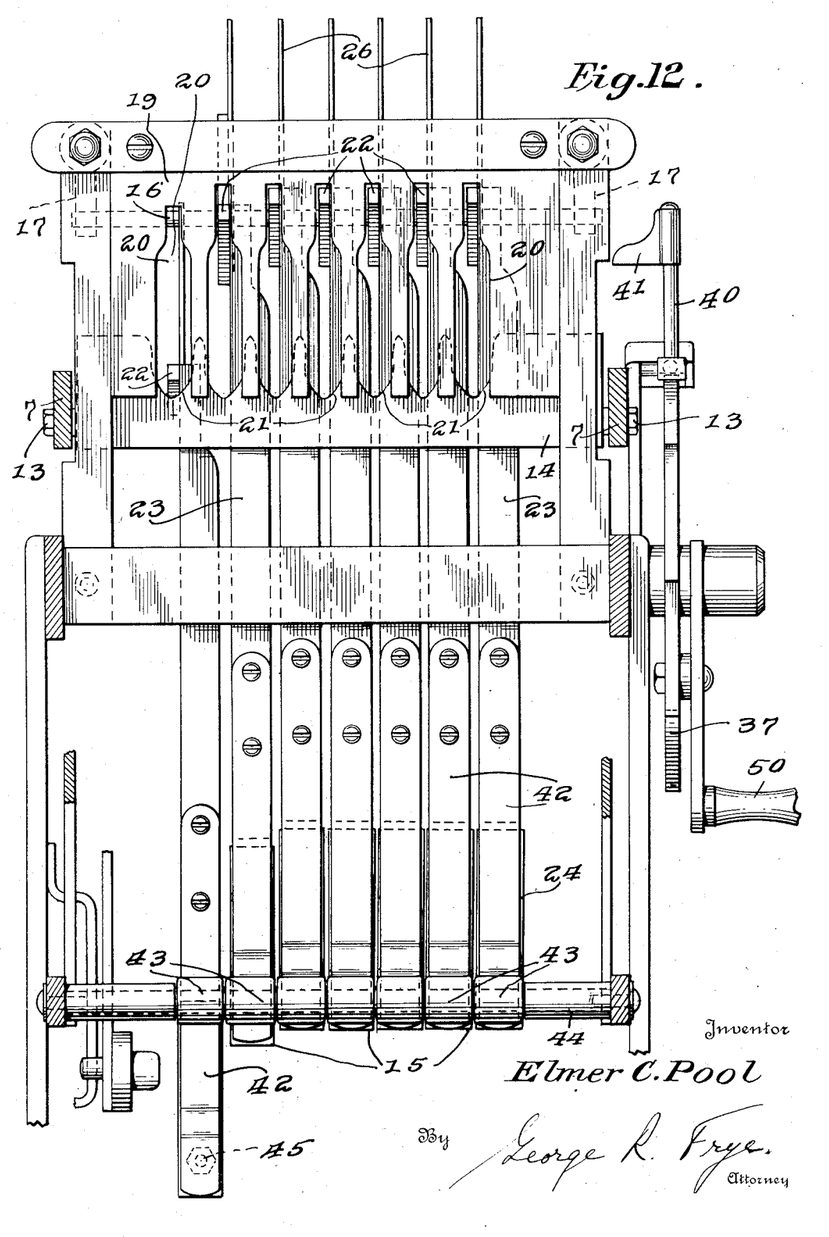
Figure 12 is an elevation taken substantially on the line 12—12 of Figure 3, looking in the direction of the arrows.

The scale beam 7 adjacent the pendent weight supporting frame is formed with pivots 13 (see Figure 6) between which is mounted a weight-receiving frame 14 adapted to serially receive the several pendent weights as required to offset the weight of loads upon the platform. The several weights 15 may be of any desired weight-offsetting capacity, and are preferably arranged side by side substantially as shown in Figures 3, 4 and 8, each weight resting upon a central crossbar 16 in position to be deposited upon the weight-receiving frame when desired. The ends of the crossbar 16 are mounted in brackets 17 adjustably mounted for longitudinal movement on the longitudinal side bars 18 of the weight-supporting frame whereby the crossbar 16 may be adjusted for accurately positioning the several weights. The side bars 18 are arranged between end pieces 19 in which are formed cammed slots 20 (see Figures 4 and 12) for the purpose of guiding the unit weights in their positions on and off the scale beam. To aid in maintaining this separation the end pieces of the weight-receiving frame are provided with notches 21 each of which receives lugs 22 of the unit weights when deposited upon the scale beam. It will be understood that these notches may be so placed that they will separate the unit weights by predetermined distances. In practice it is desired to keep the weights as close together as possible while allowing for all necessary clearance should the vibration of the scale parts tend to set the unit weights and the scale beam in vibration.

Figures 5, 13:
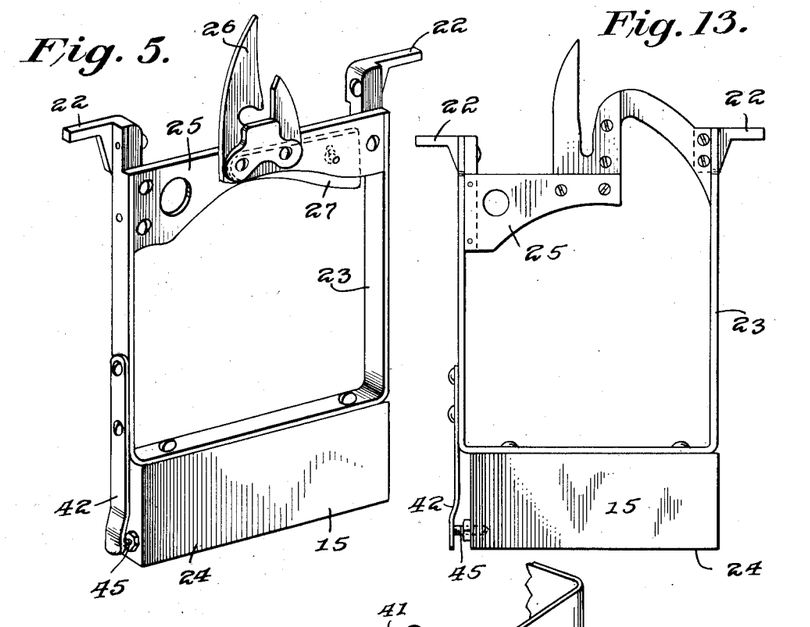
Figure 5 is a detail perspective view of one of the weight units and associated parts.
Figure 13 is an elevation of one of the unit weights.
Figure 6:
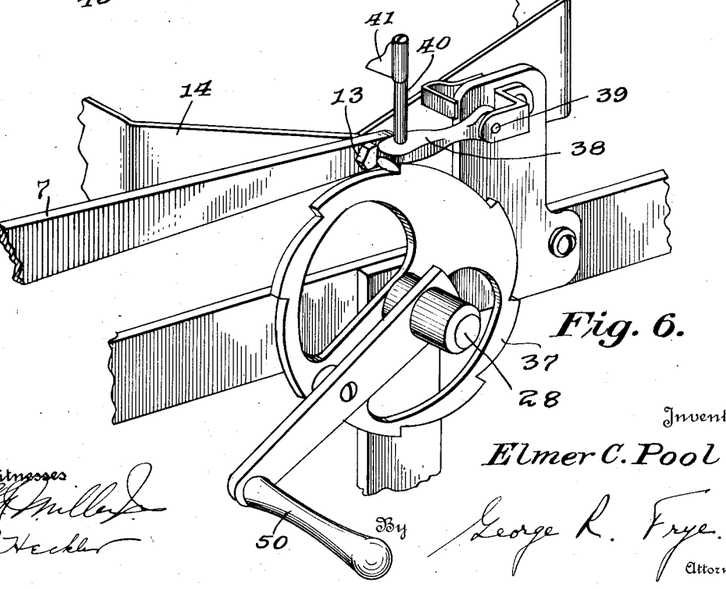
Figure 6 is a detail perspective view of the crank and ratchet wheel for lifting the weights from the scale beam after they have been automatically deposited thereon.
Figure 7:
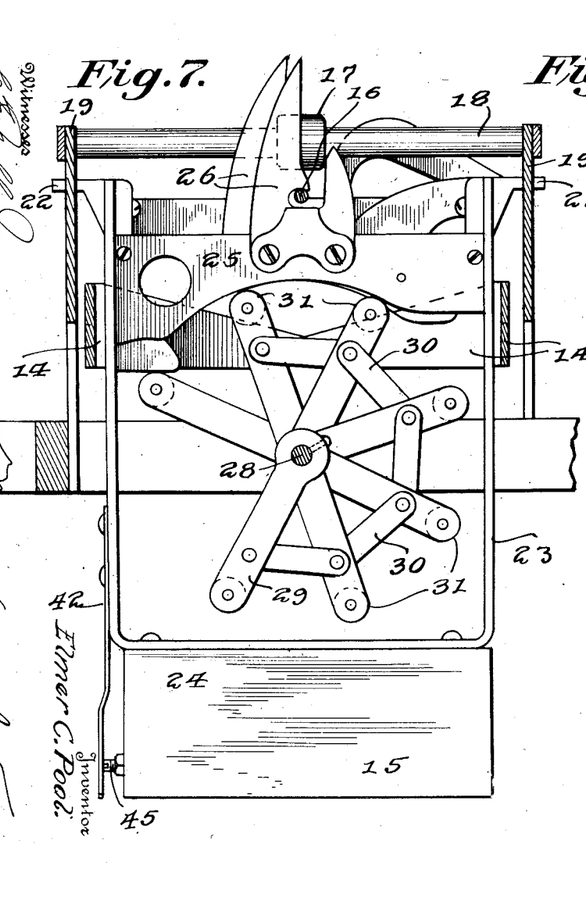
Figure 7 is a vertical sectional view taken substantially on the line 7—7 of Figure 3.

Each unit weight preferably comprises a frame 23 at the upper extremities of which extend the lugs 22 and at the lower extremities are heavy masses of metal 24, preferably lead or cast iron. By varying the weight of this lower mass the load offsetting capacity of the weight may be changed at will. Adjacent the upper portion of the frame 23 is provided a crossbar 25 adapted to carry a supporting hook 26 by means of which the weight is suspended upon the crossbar 16 when not in use upon the scale beam. This hook is preferably constructed substantially as shown in Figure 5, though in certain of the weights the hook may be omitted and the weight supported upon an arm of the weight-depositing mechanism, as will be hereinafter described. The lower face of the crossbar 25 is curved and shaped to co-operate with a crank arm upon the weight-depositing mechanism to accomplish the movements desired to place the weight upon the crossbar 16 and remove it therefrom when desired. These movements, as will be hereinafter described, comprise first a lifting, then a side wise movement to clear the hook portion from the crossbar 25, and then a lowering motion to deposit the weight upon the scale beam, and, of course, in returning the weight to its original position these movements occur in the reverse order. To accomplish these movements each crossbar is preferably provided with a detachable portion 27 which has a curved lower surface co-operating with the curved portion of the crossbar 25 and the curves are arranged from a center eccentric to that on which the crank arm of the weight-depositing mechanism rotates. By varying the extent of the eccentricity of this curve and its height from the hub of the crank arm the extent of the sidewise and lifting movements of the weight may be regulated.

The weight-depositing mechanism preferably comprises a shaft 28 journalled in the weight-supporting frame and carrying a series of crank arms 29 (see Figures 7 and 8) arranged one under each of the unit weights 15. These crank arms are arranged to extend at various angles and are braced in their predetermined positions by means of links 30. At their outer ends the crank arms 29 carry rollers 31 arranged to contact with the curved portions of the crossbars 25 on the unit weights and as the arms pass across the curved surfaces the movements hereinbefore described for lifting and depositing the weights or returning them to their original positions are effected. It will be understood that the distance of the rollers from the shaft 28 may be varied and by so doing the height to which the unit weights will be lifted may be regulated. Further, it will be seen that after one of the crank arms has deposited its weight upon either the crossbar 16 or the weight-receiving frame it passes on and does not again contact with said weight until it is desired to reverse the operation. Thus, each of the crank arms performs its function and makes way for the next crank arm in the series, whereby the depositing of the weights becomes regulated by the rotation of the shaft 28. In the operation of the scale this rotation is effected through the pinion 32 fixed on this shaft which co-operates with the rack 33 pivotally connected with one arm of a weighted lever 34 (see Figures 2 and 3). The lever is preferably pivoted intermediate its ends, as at 35, and its other arm carries a weight 36 adapted to be raised when the unit weights are resting upon the crossbar 16. Through this pinion, rack and weighted lever the shaft 28 is rotated whenever it is free to rotate, the weight 36 falling and moving the rack and pinion. To prevent the rotation of this shaft and its crank arms except when desired a ratchet wheel 37 is fixed adjacent one extremity of the shaft and a ratchet or trigger 38 is arranged to normally hold the ratchet wheel against rotation. This ratchet, as herein shown, is pivoted upon the supporting frame slightly above the ratchet wheel, as at 39, whereby the weight of the ratchet itself tends to at all times hold it into engagement with the periphery of the ratchet wheel. A pin 40 is secured upon the ratchet 39 and carries a laterally extending lug 41 arranged in the path of movement of the receiving frame 14 on the scale beam, whereby lifting of the scale beam, due to the placing of a load upon the scale platform, will serve to elevate the ratchet 38 out of contact with its ratchet wheel, allowing the weighted lever 34 to rotate the shaft 28 and its crank arms until the ratchet is again permitted to fall into engagement with its ratchet wheel. This is effected whenever sufficient of the unit weights have been deposited upon the scale beam to almost offset the weight of the load upon the scale platform, whereupon the scale beam sinks slightly and allows the ratchet 38 to fall. It has been found to be advisable to allow certain of the crank arms to remain in contact with the crossbars of their unit weights when said weights are off of the scale beam, instead of supporting these weights upon the crossbar 16. The weights so supported upon the crank arms will fall immediately when the scale beam rises and disconnects the ratchet 38 from its ratchet wheel, and as the weights fall the next crank arm is brought into contact with its crossbar and lifts its unit weight off of the crossbar 16 and supports it upon the roller 31 until the ratchet is again tripped or the weights that have been deposited upon the scale beam are returned to their original positions. This arrangement, as will be readily seen, permits more rapid operation. As each weight is lowered from its uppermost position onto the scale beam the lugs 22 thereof fall into contact with the notches 21 upon the receiving frame of the scale beam, and, as will be noted in Figure 4, the center of said notch is arranged slightly to the right of the center of the slots 20 in which said lugs have previously been guided. Thus, in falling the unit weight is moved a short distance to the right, further separating it from its next adjacent weight. Similarly, when the weights are lifted from the receiving frame to their original positions the lugs 22 contact with the walls of the cam-shaped slots 20 and are guided to the left to effect a bunching of the weights in the interest of compactness.

To prevent vibration of the weights in their normal position, as well as during their raising and lowering movements, I preferably provide a series of resilient strips 42 (see Figures 5, 9 and 12) secured at its upper extremity to the frame 23 of each unit weight and at its lower extremity being spaced from said weight a distance sufficient to keep the strip in constant contact with rollers 43 mounted on the cross shaft 44 adjacent the lower extremity of the supporting frame. To maintain the desired distance I preferably provide an adjusting means such as the set screw 45 between the weight and the resilient strip. As will readily be seen from the drawings, when the unit weights are supported upon the crossbar 16 the resilient strips 42 are maintained in close contact with the rollers 44 so as to prevent swinging movement of the weights, and as the weights are lowered from this position they are guided in their downward movements by the contact of the strips and rollers. When the weights are upon the scale beam they are free from contact with such rollers and their weight-offsetting capacity is unimpaired.

The operation of the scale is believed to be apparent from the foregoing description. A load being placed upon the scale platform will depress the scale beam 7 through the medium of the platform-supporting levers and the steelyard rod 10, the depression of the scale beam serving to elevate the pendulums of the weight-offsetting mechanism through a pull exerted thereon through the hook rod 11. The raising of the pendulums will serve to counterbalance the weight of a load within the capacity of the pendulum counterbalance mechanism. When the weight of the load placed on the platform exceeds the capacity of the pendulum counterbalance mechanism a portion of this weight may be offset by depositing one or more of the detachable counterpoise weights 15 onto the weight-receiving frame 14 carried by the scale beam, this depositing of the counterpoise weights being automatically effected by the weight-receiving frame coming into contact with the ratchet 38 and raising the same from its ratchet wheel, thereby permitting the rotation of the shaft 28 and its crank arms to effect the lowering of one or more of the weights 15. As soon as the counterbalancing capacity of the weights 15 so deposited approaches the weight of the load on the platform the scale beam lowers, permitting the ratchet 38 to fall into engagement with its ratchet wheel and stopping the rotation of the shaft 28 and crank arms. Thus, the counterpoise weights 15 are automatically deposited to offset the major portion of the weight of the load on the platform, and the remaining portion of such weight is taken up by the pendulum counterbalance mechanism, as hereinbefore described. As each of the counterpoise weights 15 is deposited its weight counterbalancing capacity is indicated through an opening 46 in the scale dial (see Figure 1). One form of mechanism for effecting such indication is shown in dotted lines in Figure 1, and comprises a lever 47 pivoted intermediate its ends and carrying on one arm a chart 48 bearing numerals showing the weight capacities, while its other arm is connected with the weighted lever 34 by a link 49. Since the rocking movement of the weighted lever 34 imparts the rotation to the shaft 28 carrying the cross arms its movement is in direct proportion to the depositing of the weights 15 and the connection herein shown will afford accurate indications of the counterbalancing capacities of such deposited weights.

To return the weights to their original positions I provide a handle 50 extending outside of the casing 5 of the scale for ready manipulation by the operator. This handle is fastened to the shaft 28 and may be rotated only in one direction, its rotation in the opposite direction being prevented by the ratchet wheel 37 and ratchet 38 (see Figure 6). When rotated the handle moves the shaft 28 and its crank arms to effect the raising of the weights from the scale beam, the crank arm being brought into contact with the crossbar of the weight, then elevating the same to a position above the crossbar 16, then moving it sidewise to bring its hook portion across the bar 16, then passing on out of engagement with the weight. Simultaneously, the rotation of the shaft 28 through the handle 50 serves to effect the raising of the weighted portion of the lever 34 to its original position through the pinion 32 and rack 33, thereby returning the lever 47 carrying the weight indications to its original position. The scale is now ready for the next weighing.

In Figure 10 I have illustrated a modified form of unit weight operating device whereby the scale itself automatically effects the return of the unit weights to their original positions as well as depositing them from such positions upon the scale beam. In this construction I provide an electrical contact 51 adjacent the fulcrum pivot of the scale beam 7ª which rocks with the scale beam and always engages a stationary contact 52 connected directly with a battery or other source of electric current, as by the wire 53. The contact 51 is electrically connected with a contact 54 adjacent the outer extremity of the scale beam to which it is rigidly secured though insulated therefrom. This contact 54 is arranged to engage with a stationary contact 55 when the scale beam is in its lowermost position, as shown in Figure 10, and with an elevated contact 56 when the scale beam is raised to its extreme position, as when a weight on the platform exceeds the counterbalancing capacity of the pendulum mechanism. The upper contact 56 is electrically connected with one end of the winding of a magnet 57, the other end of which is connected with the battery as through the wire 58. Whenever this magnet is energized it lifts the ratchet 38ª, thereby freeing the ratchet wheel 37ª to rotate with the shaft 28 which, it will be understood, is identical with the shaft 28 hereinbefore described in connection with the first-described modification and carries the same crank arms 29 and pinion 32. The rack 33ᵃ co-operating with the pinion 32, which is slightly altered in shape for reasons that will be apparent from the following description, is carried at one extremity of the weighted lever 34. To prevent too rapid movements of this lever under the electric impulse I preferably provide a dash pot mechanism 59 to damp the movements thereof. Thus, when a load is placed on the scale platform exceeding that of the pendulum counterbalance mechanism the beam 7ᵃ rises and closes a circuit through the engagement of the movable contact 54 with the upper contact 56 to energize the magnet 57, whereby the ratchet 38ᵃ is lifted from its ratchet wheel and held in such lifted position until the circuit is broken. When the ratchet is so lifted the weighted lever 34 effects a rotation of the shaft 28 and its crank arms to deposit the unit weights upon the weight-receiving frame. When sufficient of the weights are deposited thereon the scale beam 7ᵃ falls and the circuit is broken. This sudden breaking of the circuit permits the fall of the ratchet 38ᵃ into position to prevent further rotation of the ratchet wheel 37ᵃ of the shaft 28.

When it is desired to return the weights to their original positions, as when the load is removed from the scale platform, the scale beam 7ᵃ falls until its contact 54 engages with the lower stationary contact 55, as shown in Figure 10, whereupon a circuit is formed to energize the magnet 60 which is electrically connected, as by the wire 61, with the contact 55 and by the wires 62 and 58 with the battery. The energization of this magnet serves to throw a switch 63 into engagement with the flexible switch arm 64 to effect the passage of the current to the solenoid 65, suitable connections being made between the flexible switch arm 64 and the solenoid through the wire 66 and the return wires 67 and 58 completing the circuit to the batteries. The core 68 is retracted within the solenoid 65 when energized and through its connection with the rack 33ᵃ effects a lowering of the rack, thereby rotating the pinion 32, shaft 28 and crank arms 29 in a reverse direction to lift the unit weights 15 from their positions upon the scale beam to their original positions upon the crossbar 16. It is essential that this movement be sufficiently complete to effect the full return of the last weight so that the ratchet wheel 37ᵃ will be sufficiently rotated to permit the dropping of the ratchet into position to hold all of the weights above the scale beam. To insure this complete movement I have introduced the switch 63 hereinbefore described. As soon as the last weight 15 is removed from the scale beam (and before it reaches its uppermost position) the scale beam 7ᵃ rises and breaks the engagement between the contacts 54 and 55, thereby breaking the original circuit energizing the solenoid 65, but through a wire 70 arranged between the battery and the switch 63 I maintain an auxiliary circuit continuing the energization of the solenoid as long as the switch 63 remains in contact with the flexible switch arm 64, thus continuing the upward movement of the last weight despite the fact that the scale beam is now rising. However, the magnet 60 holding the switch 63 into its lowermost position (shown in full lines in Figure 10) is now broken as the contacts 54 and 55 separate and there is nothing to prevent the return of the switch 63 to its original position (shown in dotted lines in Figure 10) when sufficient impulse is given to throw said switch. Such impulse is effected through the depending arm 38ᵇ on the ratchet 38ᵃ engaging a pin 71 on the switch. This arm is moved into the position shown in dotted lines when the ratchet is elevated by the last ratchet tooth and throws the switch 63, now that its electrical attraction with the magnet 60 has been broken. The throwing of such switch breaks the contact with the flexible arm 64 and de-energizes the solenoid 65. To present a substantially balanced switch, the switch 63 is pivoted intermediate its ends as at 72 (see Figure 11) and a weight 73 is provided on one arm thereof to slightly overbalance the other arm of the switch. Thus, when the electric magnet 60 is energized it has a pull sufficient to raise the weighted arm of the switch and effect an engagement with the flexible arm 64, but when the magnet 60 is de-energized the slightest impulse on the weighted arm will be sufficient to cause said arm to fall into the position shown in dotted lines in Figure 10, breaking the engagement with the flexible arm 64.

While it will be apparent that the illustrated embodiments of my invention herein disclosed are well calculated to adequately fulfill the objects primarily stated, it is to be understood that the invention is susceptible to variation, modification and change within the spirit and scope of the subjoined claims.

Having described my invention, I claim:

1. In a weighing scale, in combination, a frame, a scale beam, a plurality of weights arranged side by side above the scale beam, a support on the frame for the weights above the beam, and mechanism operating in the frame for lifting the weights from the support and lowering them onto the beam.

2. In a weighing scale, in combination, a frame, a scale beam mounted on the frame, a plurality of weights arranged side by side above the scale beam, a support on the frame for the weights above the beam, and mechanism operating in the frame for moving the weights laterally to clear the support and lowering them onto the beam.

3. A weight-depositing mechanism for scales comprising a scale beam, a plurality of weights arranged side by side above the scale beam, a support for the weights above the beam, and a rotary mechanism for lifting the weights from the support and lowering them onto the beam.

4. A weight-depositing mechanism for scales comprising a scale beam, a plurality of weights arranged side by side above the scale beam, a support for the weights above the beam, and a rotary mechanism having a plurality of cranks arranged to lift the weights from the support and lower them onto the beam.

5. A weight-depositing mechanism for scales comprising a scale beam, a plurality of weights arranged side by side above the scale beam, a support for the weights above the beam, means for moving them laterally to clear the support and lowering them onto the beam, and manually-operated means for returning the weights to their original positions.

6. A weight-depositing mechanism for scales comprising a scale beam, a plurality of weights arranged side by side above the scale beam, a support for the weights above the beam, a rotary mechanism for lifting the weights from the support and lowering them onto the beam, and means whereby the rotation of such mechanism may be reversed to restore the weights to their original positions.

7. A weight-depositing mechanism for scales comprising a scale beam, a plurality of weights arranged side by side above the scale beam, a support for the weights above the beam, a rotary mechanism having a plurality of cranks arranged to lift the weights from the support and lower them onto the beam, and means whereby the rotation of such mechanism may be reversed to restore the weights to their original positions.

8. A weight-depositing mechanism for scales comprising a scale beam, a plurality of weights arranged side by side, a support for the weights above the beam, and rotary means for lifting the weights from the support and lowering them onto the beam, the weights having surfaces eccentric to the center of rotation and adapted to be engaged by the lowering means.

9. A weight-depositing mechanism for scales comprising a scale beam, a plurality of weights arranged side by side, a support for the weights above the beam, and a rotary mechanism for lifting the weights from the support and lowering them onto the beam, the weights having surfaces eccentric to the center of rotation and adapted to be engaged by the lowering means.

10. A weight-depositing mechanism for scales comprising a scale beam, a plurality of weights arranged side by side, a support for the weights above the beam, and a rotary mechanism having a plurality of cranks arranged to lift the weights from the support and lower them onto the beam, the weights having surfaces eccentric to the center of rotation and adapted to be engaged by the lowering means.

11. In a weighing machine and in combination with a lever thereof, a plurality of weights arranged side by side, a support for said weights above the lever, a rotary shaft having a plurality of cranks respectively engaging said weights, means for rotating the cranks in one direction to deposit the weights serially upon the lever, and means for rotating the cranks in the reverse direction to restore the weights to their original positions.

12. In a weighing machine and in combination with a lever thereof, a plurality of weights arranged side by side, a support for said weights above the lever, a rotary shaft having a plurality of cranks respectively engaging said weights, means whereby the movement of the lever will cause the rotation of the cranks in one direction to deposit the weights serially upon the lever, and means for rotating the cranks in the reverse direction to restore the weights to their original positions.

13. In a weighing machine and in combination with a lever thereof, a plurality of weights arranged side by side, a support for said weights above the lever, a rotary shaft having a plurality of cranks respectively engaging said weights, means for rotating the cranks in one direction to deposit the weights serially upon the lever, and manually-operated means for rotating the cranks in the reverse direction to restore the weights to their original positions.

14. In a weighing machine and in combination with a lever thereof, a plurality of weights having eccentrically curved surfaces arranged side by side, a support for said weights above the lever, a rotary shaft having a plurality of cranks respectively engaging the eccentric surfaces of said weights, means for rotating the cranks in one direction to deposit the weights serially upon the lever, and means for rotating the cranks in the reverse direction to restore the weights to their original positions.

15. In a weighing machine and in combination with a lever thereof, a plurality of weights having eccentrically curved surfaces arranged side by side, a support for said weights above the lever, a rotary shaft having a plurality of cranks respectively engaging the eccentric surfaces of said weights, means for rotating the cranks in one direction to deposit the weights serially upon the lever, and manually-operated means for rotating the cranks in the reverse direction to restore the weights to their original positions.

16. In a weight-depositing mechanism for scales, a plurality of weights each having a skeleton body supporting a heavy mass, and a cross arm provided with an curved cam surface adapted to be acted upon by a manipulating device.

17. In a weight depositing mechanism for scales, in combination, a plurality of weights each having a skeleton body supporting a heavy mass, a cross member provided with an eccentrically curved cam surface adapted to be acted upon by a manipulating device, and a hook carried by said cross member for normally supporting the weight.

18. In a weighing machine, in combination, a weight adapted to be deposited upon a scale lever, comprising a skeleton body portion supporting a heavy mass of metal and carrying a member provided with a curved cam surface adapted to be acted upon by a manipulating device.

19. In a weighing machine, in combination, a weight adapted to be deposited upon a scale lever, comprising a skeleton body portion supporting a heavy mass of metal and carrying a member provided with a curved cam surface and having guide arms extending laterally from the body portion.

20. In a weighing machine, in combination, a weight adapted to be deposited upon a scale lever, comprising a skeleton body portion supporting a heavy mass of metal and carrying a member provided with a curved cam surface adapted to be acted upon by a manipulating device, and a hook for normally suspending the weight.

21. A weight-depositing mechanism for scales comprising a scale beam, a notched weight-receiving member mounted thereon, a plurality of weights arranged side by side, a support for the weights above the beam, and mechanism for first lifting the weights, then moving them laterally to clear the support, and then lowering them into the notches of the receiving member.

22. A weight-depositing mechanism for scales comprising a scale beam, a notched weight-receiving member mounted thereon, a plurality of weights arranged side by side, a support for the weights above the beam, and mechanism for lifting the weights from the support and lowering them successively into adjacent notches in the weight-receiving member.

23. A weight-depositing mechanism for scales comprising a scale beam, a notched weight-receiving member mounted thereon, a plurality of weights arranged side by side, a support for the weights above the beam, and a rotary mechanism for lifting the weights from the support and lowering them successively into adjacent notches in the weight-receiving member.

24. A weight-depositing mechanism for scales comprising a scale beam, a notched weight-receiving member mounted thereon, a plurality of weights arranged side by side, a support for the weights above the beam, and a rotary mechanism for lifting the weights from the support and lowering them successively into adjacent notches in the weight-receiving member, including a shaft having a pinion and a ratchet wheel thereon, a rack weighted to rotate the pinion when the shaft is free, and a pawl engaging the ratchet wheel for normally preventing rotation thereof.

25. A weight-depositing mechanism for scales comprising a scale beam, a plurality of weights arranged side by side, a support for the weights above the beam, and a rotary mechanism having a plurality of cranks supported on a shaft and arranged to engage the weights to lower them on to the beam, a pinion on said shaft, a weighted rack arranged to rotate the pinion when the shaft is free, and locking means for normally preventing the rotation of the shaft.

26. A weight-depositing mechanism for scales comprising a scale beam, a plurality of weights arranged side by side, a support for the weights above the beam, and a rotary mechanism having a plurality of cranks supported on a shaft and arranged to engage the weights to lower them on to the beam, a pinion on said shaft, a weighted rack arranged to rotate the pinion when the shaft is free, locking means for normally preventing the rotation of the shaft, and indicating means actuated from said rack for disclosing the counterbalancing capacity of the weights deposited.

27. A weight-depositing mechanism for scales comprising a scale beam, a plurality of weights arranged side by side, a support for the weights above the beam, and a rotary mechanism having a plurality of cranks supported on a shaft and arranged to engage the weights to lower them on to the beam, a pinion on said shaft, a weighted rack arranged to rotate the pinion when the shaft is free, and a pawl and ratchet mechanism connected with the shaft for normally preventing its rotation.

28. A weight-depositing mechanism for scales comprising a scale beam, a plurality of weights arranged side by side, a support for the weights above the beam, and a rotary mechanism having a plurality of cranks supported on a shaft and arranged to engage the weights to lower them on to the beam, a pinion on said shaft, a rack arranged to rotate the pinion when the shaft is free, a weighted lever connected with said rack, and locking means for normally preventing the rotation of the shaft.

29. A weight-depositing mechanism for scales comprising a scale beam, a plurality of weights arranged side by side, a support for the weights above the beam, and a rotary mechanism having a plurality of cranks supported on a shaft and arranged to engage the weights to lower them onto the beam, a pinion on said shaft, a rack arranged to rotate the pinion when the shaft is free, a weighted lever connected with said rack, locking means for normally preventing the rotation of the shaft, and indicating means actuated from said weighted lever for disclosing the counterbalancing capacity of the weights deposited.

30. A weight-depositing mechanism for scales comprising a scale beam, a plurality of weights arranged side by side, a support for the weights above the beam, a rotary shaft having a plurality of cranks arranged to engage and lift the weights from the support and lower them onto the beam, a ratchet and pawl mechanism connected with the shaft for normally preventing its rotation, and a trigger connected with the ratchet and arranged in the path of movement of the scale beam.

31. A weight-depositing mechanism for scales comprising a scale beam, a weight-receiving member mounted thereon, a plurality of weights arranged side by side, a support for the weights above the beam, a rotary shaft having a plurality of cranks arranged to engage and lift the weights from the support and lower them onto the weight-receiving member, a ratchet and pawl mechanism connected with the shaft for normally preventing its rotation, and a trigger connected with the ratchet and arranged in the path of movement of said weight-receiving member.

32. A weight depositing mechanism for scales comprising a scale beam, a plurality of weights arranged side by side, a support for the weights above the beam, automatic means under the control of the scale beam for depositing said weights upon said beam to counterbalance the major part of the load on the scale, including a rotary mechanism having a plurality of cranks supported on a shaft and arranged to engage the weights to lower them onto the beam, a pinion on said shaft, a rack arranged to rotate the pinion when the shaft is free, a weighted lever connected with said rack, locking means for normally preventing the rotation of the shaft, and indicating means actuated from said weighted lever for disclosing the counterbalancing capacity of the weights deposited.

33. A weighing scale including a scale beam, connections therefrom to the load-receiver, a plurality of weights arranged side by side, a rotary mechanism normally supporting the weights above the scale beam, a trigger-controlled locking means normally preventing the rotation of said mechanism, means carried by the scale beam for lifting the trigger, and pendulum load-counterbalancing mechanism connected with the scale beam for offsetting the fractional portion of the load in excess of the counterbalancing capacity of the weights deposited on the beam.

34. In a weighing machine and in combination with the scale beam thereof, a plurality of weights arranged to be deposited serially upon the scale beam, a frame normally supporting the weights, and anti-vibration means for steadying the weights including a resilient strip carried by each weight and normally engaging a portion of the frame.

35. In a weighing machine and in combination with the scale beam thereof, a plurality of weights arranged to be deposited serially upon the scale beam, a frame normally supporting the weights, and anti-vibration means for steadying the weights including a resilient strip carried by each weight, and a roller mounted upon the frame and normally engaging each strip.

36. In a weighing machine and in combination with the scale beam thereof, a plurality of weights arranged to be deposited serially upon the scale beam, a frame normally supporting the weights, and anti-vibration means for steadying the weights including a resilient strip carried by each weight, and means for adjusting the position of the resilient strips.

ELMER C. POOL.

Witnesses:
H. G. MILLER,
GEORGE S. MILLER.